UNITED STATES PATENT OFFICE.

BENJAMIN T. BROOKS, OF BAYSIDE, NEW YORK, ASSIGNOR TO THE COMMERCIAL RESEARCH COMPANY, A CORPORATION OF NEW YORK.

PROCESS FOR PURIFYING RESINS.

1,340,873. Specification of Letters Patent. Patented May 25, 1920.

No Drawing. Application filed May 14, 1918. Serial No. 234,397.

*To all whom it may concern:*

Be it known that I, BENJAMIN T. BROOKS, a citizen of the United States, residing at Bayside, county of Queens and State of New York, have invented certain new and useful Improvements in Processes for Purifying Resins, fully described and represented in the following specification.

The present invention relates to a process for purifying resins.

The object of the invention is to provide a more reliable process for preparing a high grade of resinous material particularly adapted for use in the manufacture of varnishes, lacquers and the like, which process will be sufficiently economical as to be generally applicable on a commercial scale.

It is known that there are certain resins, particularly the copals, including the fossil resins, which in their crude state are contaminated with refuse, such as earthy matter, woody material, bark and other organic material. It is necessary to remove such foreign matter before such resins can be used. In the prior methods in general use, it has been customary to sort the pieces of resin and grade them according to the amount of such foreign material which accompany them. Also a certain amount of hand work has been resorted to in chipping and rasping the pieces to remove as much of the foregn materal as could thus be removed. Only the best pieces which contain but a small amount of impurities can be used for high grade varnishes.

While it is possible to melt such resins by the application of heat and strain out the coarser impurities, this method is not satisfactory in practice for the reason that the heat will carbonize the finer impurities and thus injure the resin.

Hence, by the present methods, the amount of good resin of the type stated for high grade varnish making purposes and the like is restricted, with the result that the amount of high grade varnish is restricted, and its cost of production is materially increased.

Such resins, after the sorting, grading and mechanical cleaning hereinbefore referred to, are relatively insoluble in the usual solvents employed in varnish making and particularly in the oil medium and spirits of turpentine with which the best varnishes are made. Therefore, it has been the practice heretofore to melt such resins by the application of heat for considerable time in order to convert them to another form in which they are soluble in such oil medium. Probably this heat treatment results in a depolymerization of the resins, and great care is necessary during this long continued heating to avoid injury to the resins, which results from the carbonizing of any organic impurities which could not be removed by the sorting, grading and mechanical cleaning processes referred to above, with the result that the resin is discolored, with subsequent disadvantage to the varnish made therefrom.

By the present process, not only is the cost of preparation of the resins materially reduced, but, what is more important, the production commercially of a clean resinous material from various low grades of crude resin becomes a certainty, and the subsequent melting operation can be carried out more rapidly and with less care while at the same time the resultant product is in good condition for varnish making purposes.

In carrying out the new process, the crude resinous material to be purified is treated with a chlorhydrin of an olefin gaseous at normal temperatures, such, for example, as ethylene or propylene chlorhydrin ($C_2H_4$-OHCl or $C_3H_6$OHCl) or a mixture of both. These are very satisfactory, particularly with Manila, Kauri and Mexican copals or gums.

It is well to coarsely grind the resinous material before subjecting it to the action of the chlorhydrins, but the grinding need not be carried too far, as it is not desirable to comminute the woody material, bark or the like to too great an extent. Any dust resulting from this grinding operation will not injure the subsequent product and need not be separated from the material. It is advisable, however, to immerse the dust immediately in the chlorhydrin, as it quickly oxidizes when in the air, and injures the varnish product later.

The mixture of resinous material and chlorhydrin may be kept at normal temperature until all lumps of resin disappear and the mass assumes a thin, viscous condition.

In practice it is better to apply some heat to the mixture, and for this purpose this step of the process may well be carried out in a steam jacketed vessel, and advantageously one provided with a stirring mechanism.

It is important that the temperature be not too high. The operation is very much facilitated by slow stirring and gentle heat, a temperature of 60° to 70° C. being most advantageous.

When the resinous mixture has the proper uniform consistency, it is submitted to a straining or filtering step. This is best done by allowing it to flow through a fine wire mesh strainer which removes the solids, that is to say, the insoluble foreign matter or impurities. Instead of one straining operation, two or more may be employed, if desired.

The proportion of chlorhydrin to crude resinous material may vary to a considerable extent, and enough should be used to give with the resin, a mixture not too viscous, in order that the liquid may be readily strained. In practice, it will be found that a mixture in the proportion of 20 pounds of crude resin to 100 pounds of chlorhydrin will be satisfactory, though where the crude resin is very much contaminated the amount of chlorhydrin in proportion to the crude resinous material may be decreased. This is an advantage, because the poorer grades of resinous material will require less chlorhydrin and thus reduce the expense of the operation.

After the liquid mixture has been well strained of all impurities, the liquid is treated to recover the resinous material. This is best done by subjecting the liquid to the action of heat to evaporate the volatile portion, it being understood that evaporation is used here in its generic sense as including distillation as well as ordinary evaporation in vacuum pans or the like. It is important, however, that the temperature of such evaporation be kept low in order that no decomposition of the chlorhydrin or injury to the resin from burning can occur. Therefore, it is well to carry out this step in a closed apparatus at a pressure somewhat below atmospheric, the distillate or volatile portion which is driven off, being condensed for further use in the treatment of a fresh charge of resinous material. The condensate, although perhaps not a pure chlorhydrin, will be found to be entirely suitable for the carrying out of the process with succeeding charges.

The evaporating step is carried to the point where the resinous material is in a thickened plastic condition, whereupon it is discharged from the evaporating apparatus or still into suitable covered pans or trays where it is allowed to cool without unnecessary access of atmosphere. When cool, it will be found to be a clean, clear, resinous material especially suitable for varnish or lacquer making purposes, since the subsequent melting operation is attended with much less darkening of the purified resinous material. Whether this results from the mere removal of foreign matter, the action of the chlorhydrin, or the presence of a small amount thereof in the purified resin, or is due to some depolymerization of the resin during the evaporation step, is not certain at this time.

When desired, the resinous material, instead of being run from the still or evaporator into pans or trays, may be run directly into the heating kettles and subjected to the further heat treatment to render it soluble.

The solids which were held out from the liquid portions during the screening, straining or filtering step of the process as hereinbefore described, may retain some liquid in their pores and adhering to them. It is advantageous to place these solids on trays within a closed vessel connected to a condenser and pass some live steam upward through the mass, to extract or distil the liquid material, which is carried off to the condenser with the steam and is there condensed. This condensate will consist chiefly of a water solution of chlorhydrin and may be concentrated by distillation to free it of water. The resultant liquid will still be useful for the treatment of a fresh charge of crude resinous material, and may be used alone or may be combined with the distillate from the vacuum still and the mixture used for the subsequent treatment of crude resin in the same manner as described with relation to the original chlorhydrin.

By the new process herein set forth, the loss of chlorhydrin is small and the loss of resins is much less than in the old processes, while the resin obtained is in a condition as to purity far ahead of that obtained by any process heretofore used.

What I claim is:

1. The process of purifying resins, which consists in subjecting the resinous material to be purified to the action of a chlorhydrin of a gaseous olefin, separating the liquid portion from any solids accompanying it, and subjecting the liquid portion to heat to drive off the volatile portion, whereby resinous material is recovered.

2. The process of purifying resins, which consists in subjecting the resinous material to be purified to the action of a chlorhydrin of a gaseous olefin, separating the liquid portion from any solids accompanying it, subjecting the liquid portion to heat to drive off the volatile portion, whereby resinous material is recovered, condensing said volatile portion and employing it to treat a fresh charge of resinous material.

3. The process of purifying resins, which consists in mixing the resinous material to be purified with a chlorhydrin of a gaseous olefin, agitating the mixture, straining it to separate the liquid portion from any solids accompanying it, and evaporating off the volatile portion at a low heat, whereby the resinous material is recovered.

4. The process of purifying resins, which consists in mixing the resinous material to be purified with a chlorhydrin of a gaseous olefin, subjecting the mixture to a gentle heat and slow stirring, straining the mixture to separate the liquid portion from any solids accompanying it, and distilling off the volatile portion under pressure below atmospheric, whereby the resinous material is recovered.

5. The process of purifying resins, which consists in subjecting the resinous material to the action of a chlorhydrin of a gaseous olefin, separating the liquid portion from any solids accompanying it, evaporating off the liquid portion to recover the resinous material, condensing the distillate, passing steam through the solid material to extract any liquids remaining in it, concentrating said extract, uniting it with the condensed distillate, and employing the resultant liquid for treatment of a fresh charge of resinous material.

In testimony whereof, I have hereunto set my hand.

BENJAMIN T. BROOKS.